Dec. 7, 1954     H. O. KIRKPATRICK     2,696,084
REFRIGERATING APPARATUS FOR MOTOR VEHICLES
Filed Jan. 31, 1951     2 Sheets-Sheet 1

INVENTOR.
HENRY O. KIRKPATRICK
BY
Barnes, Kisselle, Laughlin & Raisch
ATTORNEYS

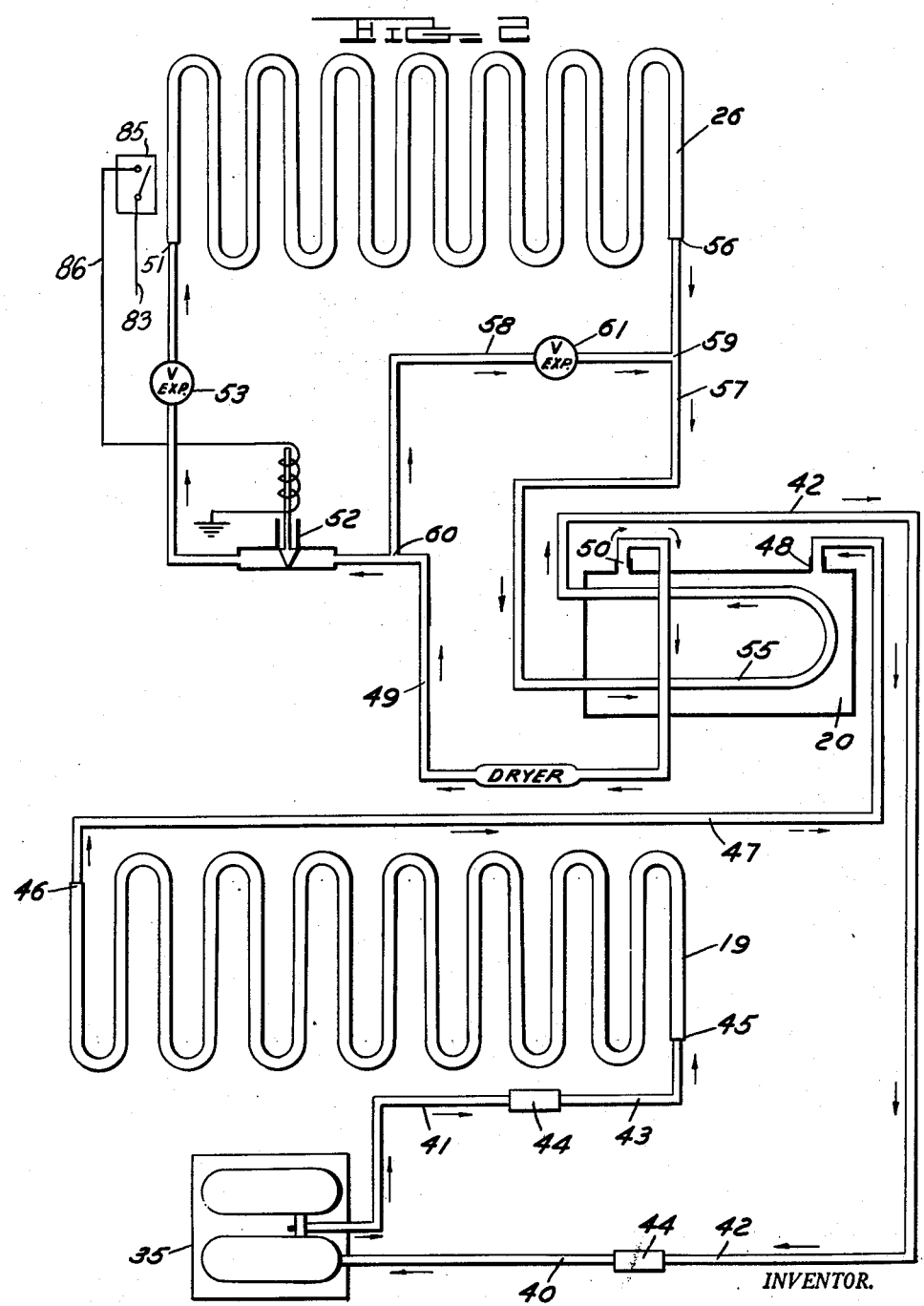

United States Patent Office 2,696,084
Patented Dec. 7, 1954

2,696,084

REFRIGERATING APPARATUS FOR MOTOR VEHICLES

Henry O. Kirkpatrick, Detroit, Mich., assignor, by mesne assignments, to Union Asbestos & Rubber Company, Chicago, Ill., a corporation of Illinois Application January 31, 1951, Serial No. 208,679

8 Claims. (Cl. 62—3)

This invention relates to refrigerating apparatus for a motor vehicle.

It is an object of this invention to produce a refrigerating apparatus for a motor vehicle which is constructed such that it can be run-in tested by the manufacturer and shipped to the purchaser in a fully assembled condition so that no refrigeration skill is required for installing the apparatus on a motor vehicle.

A further object of the invention is to produce a refrigerating apparatus which includes a compressor adapted to be driven by and at a speed in proportion to the vehicle engine, the apparatus including means for automatically maintaining the proper balance between the compressor, evaporator, and the condenser regardless of the refrigeration requirements of the system and the speed of the engine.

In the drawings:

Fig. 2 is a schematic view showing the fluid circuit of the refrigerant in the system.

Figure 1:
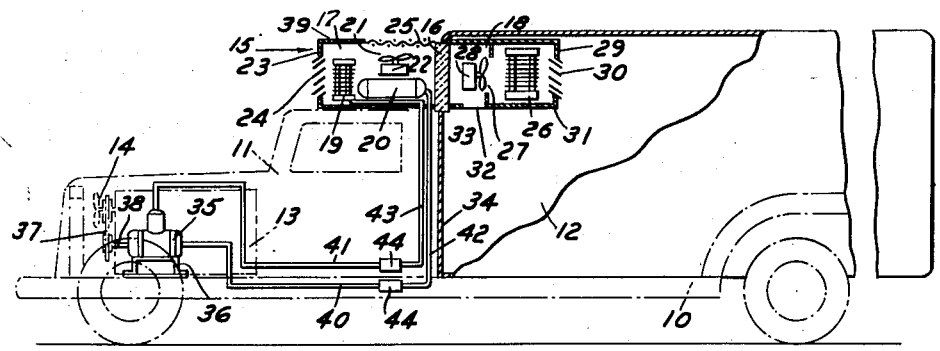
Fig. 1 is a somewhat diagrammatic sectional view of a motor vehicle equipped with the refrigerating apparatus of this invention.
Figure 3:
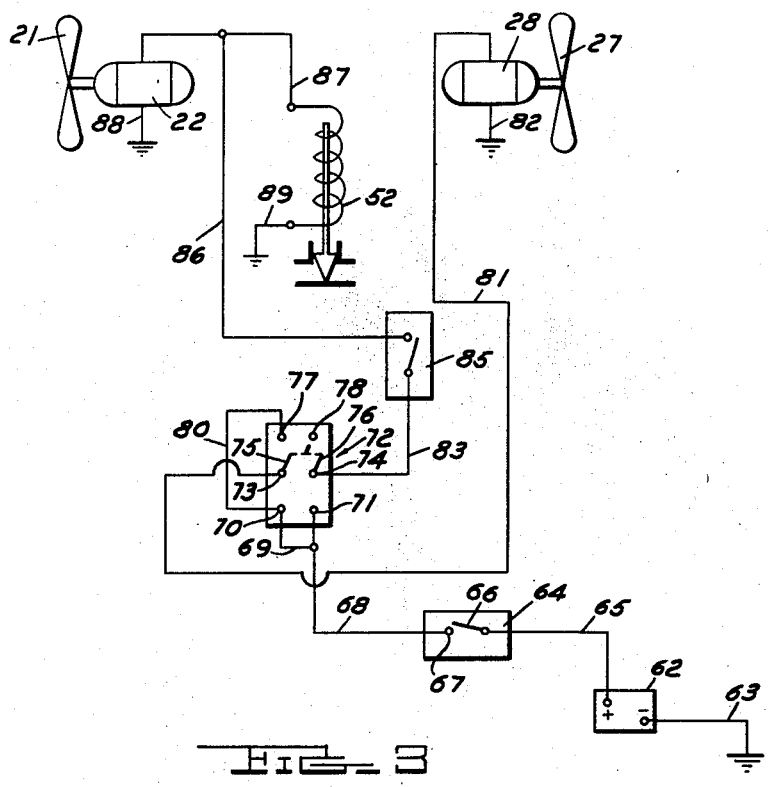
Fig. 3 is a view showing the wiring circuit of my refrigerating system.

Referring to the drawings and particularly to Fig. 1, there is illustrated a vehicle having a chassis 10, a cab 11, and an insulated storage compartment 12 which is adapted to be refrigerated. The vehicle is arranged to be propelled by an engine 13 which drives a conventional radiator cooling fan 14.

The refrigerating apparatus of this invention includes a unitary casing 15 which is divided by an insulated bulk head 16 into two compartments 17 and 18. Within the compartment 17 there is arranged a condenser coil 19, a refrigerant receiver tank 20, a condenser fan 21, and a condenser fan motor 22. The front wall 23 of compartment 17 is provided with a louvered opening 24 for the passage of air into compartment 17 and around the coils of condenser 19. The upper wall 39 of compartment 17 is provided with a vent 25 and the fan 21 is arranged to produce a flow of air into compartment 17 through louver 24 and out of the compartment through vent 25. Within compartment 18 there is mounted an evaporator 26 and a fan 27 arranged to be driven by a motor 28. The rear wall 29 of compartment 18 has a louvered opening 30 and the bottom wall 31 is apertured as at 32. Fan 27 is arranged to draw air from the refrigerated compartment 12 into the compartment 18 of casing 15 and direct the air around evaporator 26 and out of compartment 18 through louvers 30. Fan 27 serves to circulate the air within compartment 12 around evaporator 26. Casing 15 is mounted on the vehicle by forming a suitable opening 33 in the front wall 34 of compartment 12 and positioning the casing within opening 33 such that the compartment 18 is disposed within the refrigerating compartment 12 and the compartment 17 disposed exteriorly of the refrigerating compartment 12.

Refrigerant is adapted to be pumped through the apparatus contained within the casing 15 by a compressor 35. Compressor 35 is mounted on a bracket 36 which is in turn secured to the vehicle engine 13. The fan belt 37 which drives fan 14 also provides a driving connection between engine 13 and the drive shaft 38 of the compressor 35. It will be observed that with this arrangement the compressor is driven at a speed which varies in accordance with the speed of engine 13. The compressor inlet has a conduit 40 connected thereto and the outlet of the compressor is fitted with a conduit 41. These conduits are connected with the apparatus within casing 15 by a pair of conduits 42 and 43. Conduits 40 and 41 are connected with conduits 42 and 43 by self-sealing couplings 44. Couplings 44 may be of any standard type provided with internal valve members which are adapted to automatically seal the ends of the conduits when uncoupled and to permit flow of fluid through the couplings when connected. Couplings of this type are generally well known and further description of their construction is therefore believed to be unnecessary.

The end of conduit 43 within casing 15 is connected with the inlet 45 of condenser 19 as is shown in Fig. 2. The outlet 46 of condenser 19 is connected as by a conduit 47 with the inlet 48 of receiver reservoir 20. Receiver 20 in turn communicates with evaporator 26 as by a conduit 49 which extends from the outlet 50 of receiver 20 to the inlet 51 of evaporator 26. For controlling the flow of refrigerant through conduit 49, there is provided a solenoid valve 52. A thermostatic expansion valve 53 in conduit 49 admits refrigerant to evaporator 26 in accordance with the demands of the evaporator. Within reservoir 20 there is arranged a heat exchanger 55 which is adapted to exchange heat with the contents of receiver 20. Heat exchanger 55 is connected at one end with conduit 42 and at the other end with the outlet 56 of evaporator 26 as by a conduit 57. A branch conduit 58 connects at one end into conduit 57 as at 59 and at the other end with conduit 49 as at 60. Branch conduit 58 is provided with an expansion valve 61 which is arranged to open in response to a fall in pressure in evaporator 26.

The source of electrical energy for fan motors 22 and 28 and for solenoid valve 52 is derived from the vehicle storage battery 62 which, as is conventional, is grounded on one side as at 63 and which is connected on its opposite side with the vehicle ignition switch 64 as by a conductor 65. Switch 64 has a key-actuated switch arm 66 arranged to close with a contact 67 when the ignition switch is turned on. Contact 67 is connected by a conductor 68 and a branch conductor 69 with the contacts 70 and 71 of a knife switch 72. Switch 72 is of the two-pole, double-throw type having center contacts 73 and 74 provided with switch arms 75 and 76 which are arranged to close with either contacts 70 and 71 on one side of the switch or with contacts 77 and 78 on the other side of the switch. A conductor 80 connects contact 70 with contact 77. Contact 73 is connected with one side of fan motor 28 as by a conductor 81, the other side of motor 28 being grounded as at 82. The other center contact 74 of switch 72 is connected by a conductor 83 with one side of a thermostatic switch 85 mounted in compartment 18 to respond to the evaporator temperature. The other side of switch 85 is connected with fan motor 22 by a conductor 86 and with the armature of solenoid valve 52 by a conductor 87. Motor 22 is grounded as at 88 and the armature of solenoid 52 is grounded as at 89.

When it is desired to set the apparatus in operation, switch 72 is actuated such that switch arms 75 and 76 bridge contacts 70 and 73 and 71 and 74, respectively. When the ignition switch 64 is turned on, a circuit is closed from battery 62 through contacts 70 and 73 of switch 72 to evaporator fan motor 28 to thereby circulate the air in the refrigerated compartment 12 over the coils of evaporator 26. Switch 85 is originally set to close when the temperature in compartment 12 exceeds a predetermined temperature. Therefore, if the temperature of compartment 12 exceeds the setting of thermostatic switch 85, current will also flow from battery 62 across contacts 71 and 74 of switch 72 through the thermostatic switch 85 and to condenser fan motor 22 and solenoid valve 52. Atmospheric air will be blown over the coils of condenser 19 and valve 52 will be energized to open.

When the engine 13 of the vehicle is started, the compressor 36 is placed in operation and driven by the fan belt 37 at a speed proportional to the speed of the engine. The compressor 36 pumps heat laden refrigerant vapor through flexible lines 41 and 43 to the inlet 45 of condenser 19. As the refrigerant vapor flows through the coils of condenser 19, it gives up its latent heat to the air being drawn through the condenser coils by fan 21 thereby causing the refrigerant vapor to condense to the liquid state. The refrigerant is then forced from condenser 19 through conduit 47 to the inlet 48 of receiver tank 20. The liquid refrigerant then flows from tank 20 through outlet 50 and conduit 49 through valve 52 and thence through thermostatic expansion valve 53 where it expands into evaporator coil 26. As the refrigerant enters the evaporator, it boils at a relatively low temperature and picks up heat from the air being circulated over the evaporator coils by fan 27. As the refrigerant boils in the evaporator, the vapor is drawn out through outlet 56 and through conduit 57 to the heat exchanger 55 in tank 20. The refrigerant vapor passing through heat exchanger 55 picks up heat from the liquid refrigerant in receiver tank 20 and then passes through flexible lines 42 and 40 back to compressor 35 where the cycle is repeated.

When the temperature of the refrigerating compartment 12 falls to the temperature setting of thermostatic switch 85, switch 85 opens and thereby shuts off the flow of current to the fan motor 22 and to solenoid valve 52 which then closes. When this happens, the flow of refrigerant to valve 53 is stopped and the pressure in evaporator 26 falls rapidly, the outlet 56 of the evaporator being subject to the suction produced by compressor 35. When the pressure in evaporator 26 falls to the setting of expansion valve 61, valve 61 begins to open and the liquid refrigerant in line 49 flows through line 58 and expands through valve 61 into line 57 and heat exchanger 55. The refrigerant boils in heat exchanger 55 and absorbs heat from the refrigerant in receiver tank 20. The heat of compression of the refrigerant in tank 20 is thereby absorbed as heat of vaporization of the refrigerant in heat exchanger 55.

It will be noted that as long as solenoid valve 52 remains closed while the vehicle is in operation the refrigerant by-passes evaporator 26 and heat exchanger coil 55 in receiver tank 20 serves as an evaporator for the apparatus. The heat which is absorbed through the operation of coil 55 as an evaporator from the high pressure liquid in tank 20 permits the compressor 35 to operate on a closed cycle of compression and evaporization without doing any useful work. As a matter of fact, when the apparatus is operating on the "off" cycle, the only heat that must be dissipated in the system is that which is put into the compressor shaft as heat energy; and tests have shown that condenser 19 can dissipate this "heat of work" without any forced cooling by fan motor 22.

In a refrigerating arrangement of this type wherein the compressor is driven by the vehicle engine the system might be operating on the cooling cycle (switch 85 closed) while the vehicle is being driven at a relatively high speed. This would cause the capacity of compressor 35 to become greater than that for which evaporator 26 and condenser 19 are designed, and under such conditions, the conventional refrigerating system would go out of balance. However, in the arrangement described, when this happens the pressure in evaporator 26 falls to a point where expansion valve 61 automatically opens and a portion of the refrigerant would by-pass evaporator 26, expand through valve 61, and boil in heat exchanger 55. The refrigerating effect in heat exchanger 55 tends to stabilize the head pressure of the refrigerating system, and it therefore follows that this arrangement will maintain a good balance between the compressor, condenser, and evaporator regardless of the speed at which the compressor is driven.

When evaporator 26 becomes excessively frosted, switch 72 can be actuated such that switch arms 75 and 76 make contact with contacts 77 and 78. This opens the circuit to condenser fan motor 22 and valve 52, but the circuit through evaporator fan motor 22 remains closed through loop conductor 80, and fan motor 28 continues to operate thereby circulating the air in compartment 12. In many instances this will be sufficient for defrosting evaporator 26.

It will be observed that the couplings 44 enable disconnecting the compressor 35 from the apparatus within casing 15 without disturbing the refrigerant contained within the system. This greatly facilitates installation of the apparatus on the vehicle, since the complete unit can be run-in tested at the factory and shipped to the customer as a completely assembled refrigerating apparatus. After the casing 15 is mounted in the wall of the refrigerated compartment 12 as is illustrated in Fig. 1 and the compressor mounted on the engine, the couplings 44 may be manipulated to connect conduit 41 with conduit 43 and conduit 40 with conduit 42 to place the apparatus in the operating condition.

It will also be observed that heat exchanger 55 serves a very desirable purpose even when the apparatus is operating under ordinary conditions, that is, when the expansion valve 61 is not in operation. The cold vapor flowing through heat exchanger 55 from evaporator 26 draws heat from the liquid refrigerant in receiver 20, and this liquid refrigerant is in a sub-cooled condition as it flows through expansion valve 53. Sub-cooling of the refrigerant decreases the tendency of the refrigerant to flash into a vapor as it flows through expansion valve 53 thereby producing a greater refrigerant effect in evaporator 26 and in effect increasing the capacity of the system.

Although the compressor 35 is illustrated in the drawings as being driven by the vehicle engine by the fan belt 37, it will be appreciated that the compressor may be driven from the vehicle engine by other means such as, for example, a power take-off on the engine side of the vehicle transmission. The feature of importance in my arrangement is the fact that the refrigerating compressor is driven either directly or indirectly by the vehicle engine at a speed proportional to the speed of the engine. Therefore, whenever reference is made in the appending claims to a driving connection between the engine and the compressor, it is contemplated to include either a direct drive such as through the engine fan belt or an indirect drive such as through a power take-off on the engine.

I claim:

1. A refrigerating apparatus for a motor vehicle comprising a compressor, means forming a driving connection between said compressor and the engine of said vehicle, said driving means being arranged to drive the compressor at a speed proportional to the speed of the engine, a condenser communicating with said compressor, a receiver tank for refrigerant having an inlet and an outlet, means connecting said condenser with the inlet of said receiver tank, an evaporator communicating with the outlet of said receiver tank, a shut off valve in the inlet of the evaporator, means responsive to the temperature adjacent the evaporator to control the shut off valve, a heat exchanger in said receiver tank adapted to exchange heat with the contents of said receiver tank, said heat exchanger being connected at one end to said evaporator and at the other end with said compressor, and valve means adapted to by-pass refrigerant from said receiver outlet to said heat exchanger.

2. A refrigerating apparatus for a motor vehicle comprising a compressor having an inlet and an outlet, a condenser arranged to receive the output of the compressor, a receiver reservoir communicating with the condenser, an evaporator arranged to receive liquid refrigerant from said receiver reservoir, a shut off valve in the inlet of the evaporator, means responsive to the temperature adjacent the evaporator to control the shut off valve, a heat exchanger in said reservoir adapted to exchange heat with the contents of said reservoir and connected at one end to the outlet of the evaporator and at the other end to the inlet of the compressor, valve means for by-passing liquid refrigerant from the outlet of said receiver to said heat exchanger whereby said heat exchanger serves as an evaporator, and means for connecting said compressor for operation from the engine of said vehicle.

3. The combination set forth in claim 2 wherein said valve means are normally closed and arranged to open in response to a fall in pressure in said evaporator.

4. The combination set forth in claim 2 including valve means between the outlet of said receiver and the inlet of said evaporator for controlling the flow of refrigerant to said evaporator.

5. The combination set forth in claim 4 including temperature responsive means within said refrigerating compartment for controlling the operation of said last mentioned valve.

6. A refrigerating apparatus for a motor vehicle comprising a compressor, a condenser, means connecting the inlet of said condenser with the outlet of said compressor, a receiver tank for refrigerant having its inlet connected with the outlet of said condenser, an evaporator, a heat exchanger positioned in heat exchange relation with the contents of said receiver tank, means connecting the inlet of said evaporator with the outlet of said receiver tank and the outlet of said evaporator with the inlet of said heat exchanger, the outlet of said heat exchanger being connected with the inlet of said compressor, and a valve connected between the outlet of the receiver tank and the inlet of the heat exchanger, said valve being responsive to the pressure in the outlet of the evaporator to conduct liquid refrigerant from the receiver outlet to the heat exchanger inlet in response to a fall in pressure in said evaporator to a predetermined value.

7. The combination set forth in claim 6 including a shut off valve in said connection means between said evaporator and said receiver for shutting off the flow of refrigerant to said evaporator, means responsive to the temperature adjacent the evaporator to control the shut off valve, said first mentioned valve being connected into the connection means between the evaporator and the receiver in advance of said shut off valve.

8. A refrigerating apparatus comprising a compressor, a condenser, and an evaporator connected in fluid circuit, a heat exchanger having two fluid passages therein in heat transferring relationship, means connecting one of the passages in series in the circuit adjacent to the condenser to pass refrigerant at a relatively high pressure, means connecting the other passage in series between the evaporator outlet and the compressor inlet, a shut off valve in the evaporator inlet, means responsive to the temperature adjacent the evaporator to control the shut off valve, a connection from the evaporator inlet anterior to the shut off valve to the inlet end of said other passage, and a valve in the connection operable in response to the pressure in the evaporator outlet.

References Cited in the file of this patent

UNITED STATES PATENTS

| Number | Name | Date |
|---|---|---|
| Re. 23,000 | Jones | May 11, 1948 |
| 321,601 | Hennessy | July 7, 1885 |
| 328,684 | Johnson | Oct. 20, 1885 |
| 2,068,677 | Higham | Jan. 26, 1937 |
| 2,088,753 | Lanctot | Aug. 3, 1937 |
| 2,218,318 | Pfauser | Oct. 15, 1940 |
| 2,344,215 | Soling et al. | Mar. 14, 1944 |
| 2,411,296 | Schweller | Nov. 19, 1946 |
| 2,443,472 | Mayo et al. | June 15, 1948 |
| 2,452,102 | Cocanour | Oct. 26, 1948 |
| 2,530,241 | Harrington | Nov. 14, 1950 |
| 2,530,440 | Nussbaum | Nov. 21, 1950 |